United States Patent
Gordon

(10) Patent No.: US 9,832,272 B2
(45) Date of Patent: Nov. 28, 2017

(54) DYNAMICALLY SHIFTING MAP-RELATED TASKS

(71) Applicant: GOOGLE INC., Mountain View, CA (US)

(72) Inventor: David Robert Gordon, Tokyo (JP)

(73) Assignee: GOOGLE INC., Mountain View, CA (US)

( * ) Notice: Subject to any disclaimer, the term of this patent is extended or adjusted under 35 U.S.C. 154(b) by 157 days.

(21) Appl. No.: 14/637,161

(22) Filed: Mar. 3, 2015

(65) Prior Publication Data

US 2015/0256631 A1    Sep. 10, 2015

Related U.S. Application Data

(60) Provisional application No. 61/947,846, filed on Mar. 4, 2014.

(51) Int. Cl.

| | | |
|---|---|---|
| *G08G 1/123* | (2006.01) | |
| *H04L 29/08* | (2006.01) | |
| *H04L 12/26* | (2006.01) | |
| *H04W 4/02* | (2009.01) | |
| *H04L 29/06* | (2006.01) | |
| *G01C 21/26* | (2006.01) | |
| *G01C 21/32* | (2006.01) | |
| *G01C 21/36* | (2006.01) | |
| *G01C 21/34* | (2006.01) | |
| *G06F 15/16* | (2006.01) | |

(52) U.S. Cl.
CPC ............. *H04L 67/18* (2013.01); *G01C 21/26* (2013.01); *G01C 21/32* (2013.01); *G01C 21/36* (2013.01); *H04L 43/08* (2013.01); *H04L 67/36* (2013.01); *H04L 67/42* (2013.01); *H04W 4/025* (2013.01)

(58) Field of Classification Search
CPC .......... H04L 67/18; G01C 21/32; G01C 21/26
USPC .......................... 701/532, 533, 400; 709/203
See application file for complete search history.

(56) References Cited

U.S. PATENT DOCUMENTS

| | | | | |
|---|---|---|---|---|
| 9,026,354 | B1 * | 5/2015 | Persson ................. | G01C 21/26 701/400 |
| 2003/0074393 | A1 * | 4/2003 | Peart ..................... | G06F 9/547 709/203 |
| 2012/0143504 | A1 * | 6/2012 | Kalai ..................... | G01C 21/32 701/533 |

* cited by examiner

*Primary Examiner* — Mahmoud Ismail
(74) *Attorney, Agent, or Firm* — Marshall, Gerstein & Borun LLP

(57) ABSTRACT

To efficiently generate geographic content for display on client devices, a method includes determining a current status of a client device and determining a current status of a network connection between the client device and a network server. The method includes determining, based at least on one of (i) the determined current status of the client device or (ii) the determined current status of the network connection, whether a task related to generating geographic content for display on the client device should be executed on the client device or on the network server. The method also includes causing either the client device or the network server to execute the task, in accordance with the determination of where the task should be executed.

20 Claims, 6 Drawing Sheets

DYNAMICALLY SHIFTING MAP-RELATED TASKS

FIELD OF TECHNOLOGY

The present disclosure relates generally to providing map content on client devices and, more particularly, to efficiently implementing digital mapping and navigation functions in a client-server implementation.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Often, mapping applications executed on mobile computing devices, such as smartphones, tablet computers, etc., receive map data from remote servers via a network connection. In addition, tasks related to the mapping applications, such as generating map data, calculating navigation routes, providing geographic search results, etc., are often completed by remote servers, rather than being executed locally on mobile computing devices that display maps to end users.

In many situations, a remote server can execute map-related tasks more efficiently than a mobile computing device. However, under certain circumstances, reliance on a remote server for map task execution can result in a slow, stalled, erroneous, or otherwise flawed map task execution. For example, low bandwidth can delay or cause a complete failure of map-related task execution on a remote server.

SUMMARY

One embodiment of the techniques of this disclosure is a method for efficiently generating geographic content for display on client devices. The method includes determining a current status of a client device and determining a current status of a network connection between the client device and a network server. The method includes determining, based at least on one of (i) the determined current status of the client device or (ii) the determined current status of the network connection, whether a task related to generating geographic content for display on the client device should be executed on the client device or on the network server. The method also includes causing either the client device or the network server to execute the task, in accordance with the determination of where the task should be executed. These steps can be executed by one or more processors, for example.

Another embodiment of these techniques is a client device including a user interface, a communication interface to couple the client device to a network server via a communication link, and processing hardware coupled to the user interface and the communication interface. The processing hardware is configured to determine a current status of the communication link and, based at least in part on the determined status of the communication link, determine whether a task related to generating geographic content for display via the user interface should be executed on the client device or on the network server. The processing hardware is further configured to execute the task in response to determining that the task should be executed on the client device or, in response to determining that the task should be executed on the network server, transmit a message to the network server to request that the task be executed thereon.

Yet another embodiment of these techniques is a communication system including a client device configured to execute tasks of a certain type, related to generating geographic content for display on the client device. Further, the system includes a network server coupled to the client device via a communication network, such that the network server configured to execute tasks of the certain type upon request. Still further, the system includes a task assignment module implemented in the client device and/or the network server, which is configured to (i) determine a current status of a network connection between the client device and the network server, (ii) select, based at least on the current status of the network connection, one of the client device or the network server for execution of a task of the certain type, and (iii) cause one of the client device or the network server to execute the task in accordance with the selection.

DETAILED DESCRIPTION

General Overview

Figure 1:
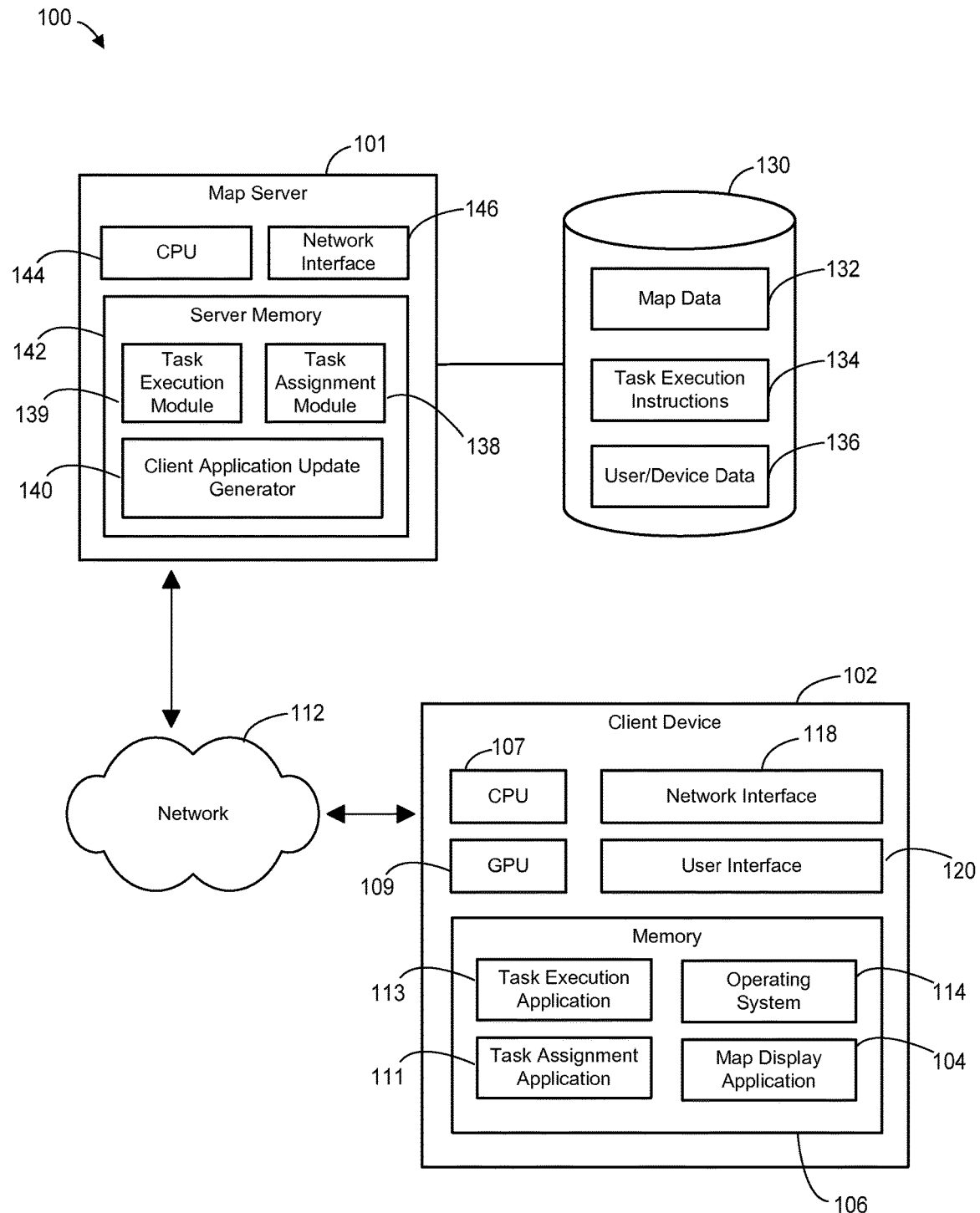
FIG. 1 is a block diagram of an example communication system in which the dynamic task shifting techniques of this disclosure can be implemented.

A mobile device of this disclosure is configured to execute a task related to generating geographic content, which also can be executed on a network server. The mobile device, the network server, or both assess such factors such as quality of service (QoS) of the network link between the mobile device and the network server, the cost of communications (e.g., subscription fees), battery power available at the mobile device, the current load of the network server, the current of the mobile device, etc., to determine whether the mobile device or the network server should execute the task. In one implementation, the mobile device receives signals indicative of some or all of these factors and determines whether the mobile device execute the task locally or request that this task be executed on the network server. In another implementation, the network server receives these and determines which should execute the task.

The task can include operations for generating navigation instructions and/or rendering a digital map, for example. The network server can operate as a provider of a geographic service, and the mobile device can operate as a client device relative to the network server.

The mobile device and the network server need not be configured to execute the task in exactly the same manner. For example, to generating navigation instructions, the network server can use more data than the mobile device (e.g., traffic data, weather data, and lane closures data) and have greater computational capability. The mobile device can be configured to execute a limited version of the algorithm implemented on the network server. In another implementation, however, the mobile device executes an instance of the same software that executes on the network server.

When the network server executes the task, the network server provides the results to the client device via the communication link. The task also can be divided between the mobile device and the network server. In other words, a larger task can be divided into several smaller tasks, some of which can be executed on the mobile device, and some of which can be executed on the network server.

Further, the mobile device may receive over-the-air (OTA) software updates to ensure that the software implemented on the client device for executing the task is up-to-date and least generally matches the corresponding instructions implemented on the network server.

Still further, the network server or another suitable network device may collect analytics data from multiple mobile devices to automatically determine the types of tasks that can be efficiently executed on mobile devices. To this end, a certain percentage of the mobile devices subscribed to the geographic service may receive software updates related to the geographic service prior to the other subscribers.

These are discussed in more detail below with reference to FIGS. 1-3. For convenience, tasks related to generating geographic content are referred to below as "mapping/navigation tasks" or simply "map-related tasks." It is further noted that, although the examples below focus primarily on a mobile device, in general these techniques can be applied to any suitable user device, including a desktop computer.

System Overview

FIG. 1 illustrates an example computing environment 100 in which execution of a mapping/navigation task may be dynamically shifted between a map server 101 and a client device 102. The client device 102 may display maps via a map display application 104, which is stored in memory 106 as a set of instructions and executes on a CPU 107 and/or a graphic processing unit (GPU) 109. The map display application 104 in general can display digital map content supplied by the map server 101 via a network 112, which can be a wired or wireless network (e.g., the Internet). For example, the map display application 104 may be a special-purpose application available at an online application store disposed at the map server 101 or an application server (not shown). A user of the client device 102 may retrieve a copy of the map display application 104 from the application server and install the retrieved copy of the mapping application on the client device 102. In other implementations, the map display application 104 can be a software component, such as a plug-in, that operates in a web browser (e.g., Google Chrome® or Apple's Safari®) or another application.

The client device 102 may also execute a task assignment application 111 to assess one or more current (e.g., real-time) performance or communication capabilities, such as quality of service (e.g., bandwidth, particularly downlink bandwidth), battery power, etc. More generally, the task assignment application 111 can determine the current status of the client device 102 and/or the current status of the communication link(s) via which the client device 102 communicates with the map server 101. Based on such an assessment, the client device 102 may determine whether the client device 102 should execute a map task (e.g., navigation route calculation or re-routing) locally (e.g., via the CPU 107) or request this service from the map server 101. If the client device 102 determines that a map task is to be executed locally, a task execution application 113 may execute the map task and produce corresponding map data for the map display application 104. By way of example, the task assignment application 111 may assess data download rates (e.g., from the map server 101), data upload rates (e.g., to the map server 102), battery life, speed of the CPU 107 or GPU 109, current utilization of the CPU 107 or GPU 109 for map-related and/or non-map-related tasks, current utilization of the memory 106 (e.g., committed or available bytes), wireless or mobile connection quality and speed, current power consumption, availability of the map server 101, and response time of the map server 101.

The memory 106 may be tangible, non-transitory memory and may include any types of suitable memory modules, including random access memory (RAM), read-only memory (ROM), a hard disk drive, flash memory, or other types of memory. In addition to the map display application 104, the memory 106 stores an operating system (OS) 114 and one or more local applications or modules (not shown). The operating system 114 may be any type of suitable operating system, and the one or more local applications may include a variety of installed applications. The map display application 104 can receive digital content via a network interface 118, and a user can interact with the map display application 104 via a user interface 120, which can include a touchscreen, a screen along with a keyboard and a mouse, speakers, etc.

In general, the client device 102 can be any suitable portable or non-portable computing device. By way of example, the client device 102 may be a smartphone, a tablet computer, a laptop computer, etc. In various implementations, the client device 102 can include fewer components than illustrated in FIG. 1 or, conversely, additional components. In some implementations, for example, the client device 102 includes multiple instances of the CPU 107.

The map server 101 may be communicatively coupled to multiple databases, such as a database 130. The database may store map data 132 including street and road information, topographic data, satellite imagery, information related to public transport routes, information about businesses or other points of interest (POIs), information about current traffic conditions, etc. The database 130 may also store task execution instructions 134 including computer-readable instructions (e.g., code), rules, settings, parameters, etc. for the execution of map-related tasks on the map server 101 or on the client device 102. In some cases, the map server 101 may generate updates for applications, such as the map display application 104, the task execution application 113, or the task assignment application 111, based on the task execution instructions 134 stored in the database 130. Such updating is further discussed with reference to FIG. 3.

The database 130 may further store user/device data 136 corresponding to the client device 102, assuming the user of the client device 102 consents to such utilization of the user/device data 136. The user/device data 136 may include, by way of example, information indicating the computing architecture and software configuration of the client device 102 as well as various analytics, or previously collected data, related to preferences of users of the client device 102, past user interaction with the map display application 104, past geographic locations of the client device 102, average upload/download speeds to and from the client device 102, past geographic searches input via the map display application 104, past navigation routes displayed on the client device 102, etc.

It will be understood that although the map server 101 is illustrated in FIG. 1 as a single device, in general the map server 101 can correspond to multiple servers responsible for respective types of content or respective map-related task executions. In the illustrated implementation, the map server 101 includes a task assignment module 138, a task execution module 139, and a client application update generator 140 stored in a server memory 142 and executed by a server CPU 144.

By executing the task assignment module 138, the map server 101 may, in some cases, determine that the execution of a certain map-related task should be "reassigned" back to the client device 102 if, for example, the map server 101 is too busy (e.g., busy executing map-related tasks for other client devices) or experiencing unexpected downtime. On the other hand, the task execution module 139 may execute map-related task requested by the client device 102 when the task assignment module 128 determines that such an execution is efficient or otherwise advantageous. For example, the task execution module 139 may execute tasks related to navigation routes, re-routes of a client device during navigation, geographic searches, etc. Additionally, the client application update generator 140 may generate updates, such as updated versions of mapping applications (e.g., binaries for particular client devices), updated computer-readable instructions to be compiled on client devices, client device-specific updates, etc., to be sent to client devices via the network 112.

Further, the task assignment module 138 in some embodiments implements the functionality of the task assignment application 111 to determine whether a map-related tasks should be executed on the client device 102 or the map server 101. In other words, rather than "reassigning" the task back to the client device 102, the map server 101 can make the original assignment.

Dynamic Shifting of Map-Related Tasks

FIGS. 2A-2D are communication flow diagrams illustrating various example scenarios in which execution of a map task is dynamically shifted to/from or divided between a client device and a map server. The communication flows illustrated in FIGS. 2A-2D may be implemented in the example computing system 100, for example.

By way of example and without limitation, a map task may include calculating a navigation route, calculating a re-route based on deviations from a navigation route, executing a geographic query, supplying map content to a map display application following user interactions (e.g., a zoom or pan), generating labels or other additional data layers, rendering map tiles, generating additional information (e.g., informational cards with business names, addresses, etc.) corresponding to one or more points of interest (POIs), retrieving imagery associated with geographic locations or POIs, or generating alerts based on user progress along a navigation route. Generally, map tasks may include any task executable by a computing device and related to a display of a digital map or navigation interface on the same or a different computing device.

In some implementations, map tasks may be executed, by default, on one of the client device 102 or the map server 101 and may be reassigned, or shifted, from the default execution device (e.g., the client device 102 or the map server 101) to another device based on a real-time evaluation of performance and/or communications capabilities. In one example scenario, illustrated in FIG. 2A, map interaction, received via a user interface 202 of the client device 204, may trigger a map display application 206 to request the execution of a map task. The map interaction may include, by way of example, a manual user interaction with the user interface 202, such as a request for a geographic query or navigation route. However, it is clear that any manual or automatic event, such as an automatic detection of a deviation from a navigation route, may trigger the map display application 206 to request the execution of a map task.

In some implementations, the map display application 206 may send the request for the execution of the map task to a task assignment application 208 on the client device 204. The client device 204 may execute the task assignment application 208 to assess a current efficiency with which the client device 204 may execute the map task. In some cases, the client device 204 may further execute the task assignment application 208 to also assess a current efficiency with which a map server 210 may execute and/or communicate results (e.g., via a network 212) of the map task.

Figure 2A:
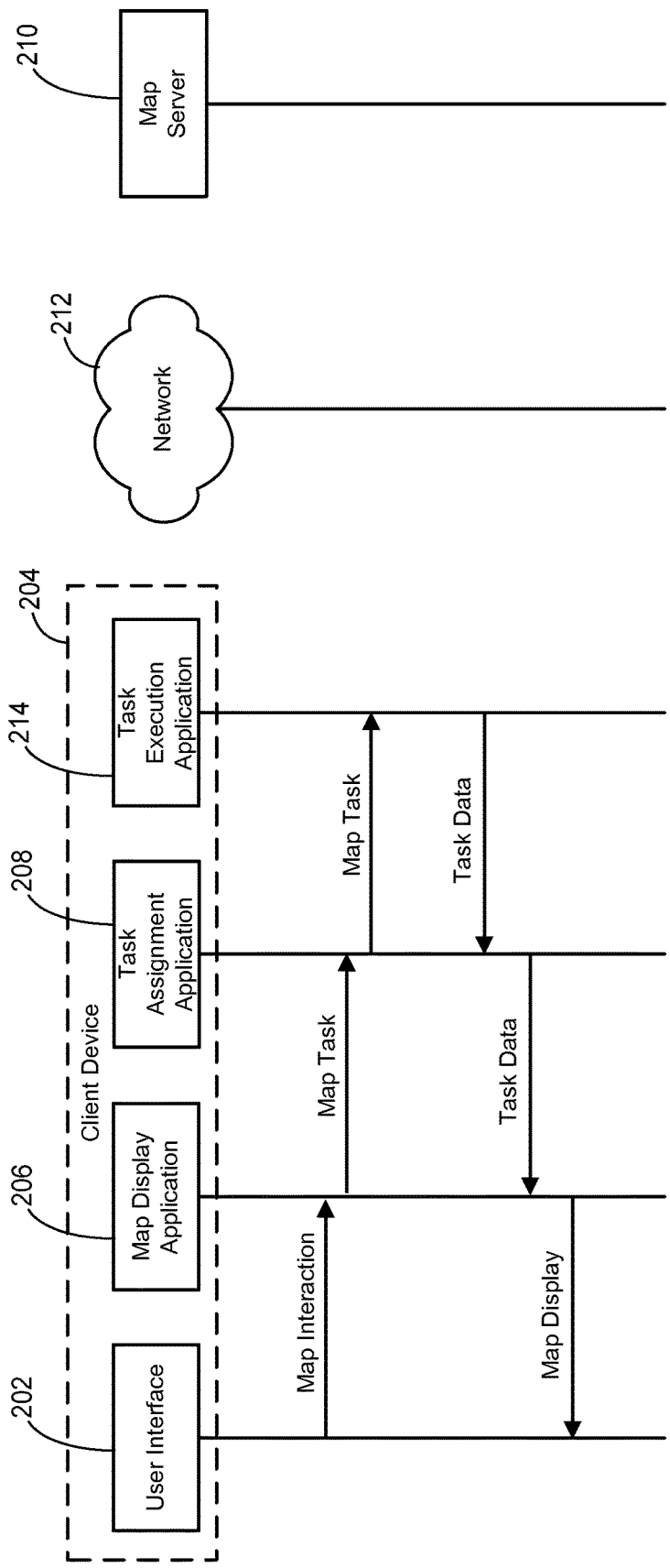
FIG. 2A is a communication flow diagram of a scenario in which a client device determines that a map-related task should be executed on the client device rather than on a network server.

In the example communication flow illustrated in FIG. 2A, the task assignment application 208 may determine that it is currently (e.g., at the time of the determination) more efficient and/or otherwise advantageous to execute the map task locally on the client device 204. Such as determination may include assessing factors such as what, if any, data is cached on the client device 204 or whether current data upload/download rates to the map server 210 favor remote execution of the map task. As a result of the determination, the task assignment application 208 may communicate the map task, or the request for execution of the map task, to a task execution application 214 on the client device 204. In turn, the client device 204 may execute the task execution application 214 to complete the map task, and the results of the map task (e.g., "Task Data") may be communicated back to the map display application 206. The map display application 206 may then display a map at the user interface 202 according to the task data.

Figure 2B:
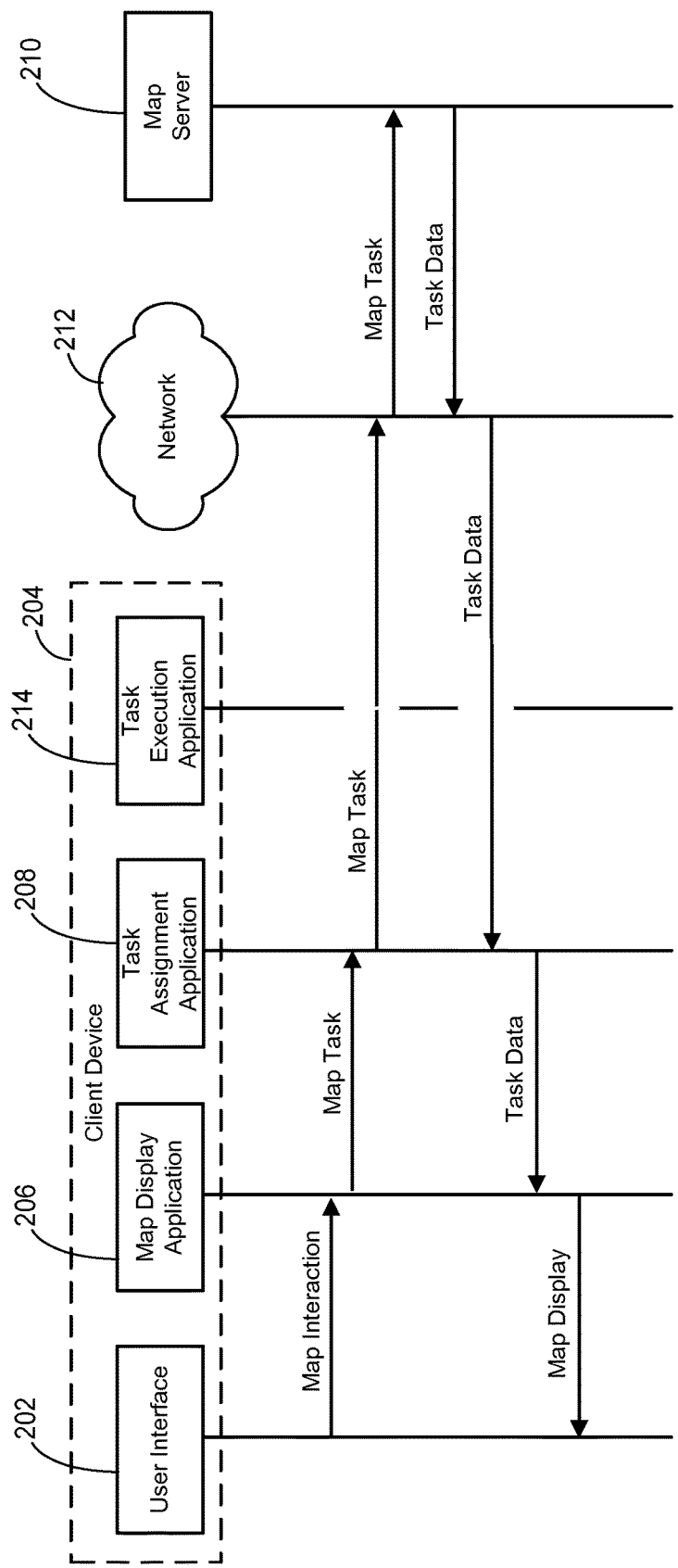
FIG. 2B is a communication flow diagram of a scenario in which a client device determines that a map-related task should be executed on a network server rather than on the client device.

In another example scenario, illustrated by the communication flow of FIG. 2B, the task assignment application 208 may determine that it is currently more efficient and/or otherwise advantageous to request execution of the map task by the map server 210. For example, the task assignment application 208 may determine that current bandwidth of the map server 210 and current properties of the network 212 (e.g., communication rates) indicate that execution of the map task on the map server 210 and subsequent communication of resulting data is more efficient than a local execution of the map task on the client device 204. As such, the task assignment application 208 may generate and send a request (e.g., Hypertext Transfer Protocol or HTTP message) for execution of the map task to the map server 210. In turn, the map server 210 may execute the map task and communicate the results of the map task (e.g., "Task Data") back to the map display application 206 of the client device 204. The map display application 206 may then display a map at the user interface 202 according to the task data.

In some cases, after assessing current performance and/or communication capabilities, the task assignment application 208 may determine that a portion of a map task is to be executed locally on the client device 204 and a portion of the map task is to be executed on the map server 210. In general, a map task may be divided in any suitable manner between the client device 204 and the map server 210. For example, a re-routing of the client device 204 along a navigation route may be divided into a retrieval of necessary map data (e.g., from a remote database) and a calculation of an appropriate navigation re-route based on the retrieved map data. In such an example case, the re-routing task may be partially executed by the map server 210 (e.g., the data retrieval portion) and partially executed by the client device 204 (e.g., the calculation of the appropriate navigation re-route).

Figure 2C:
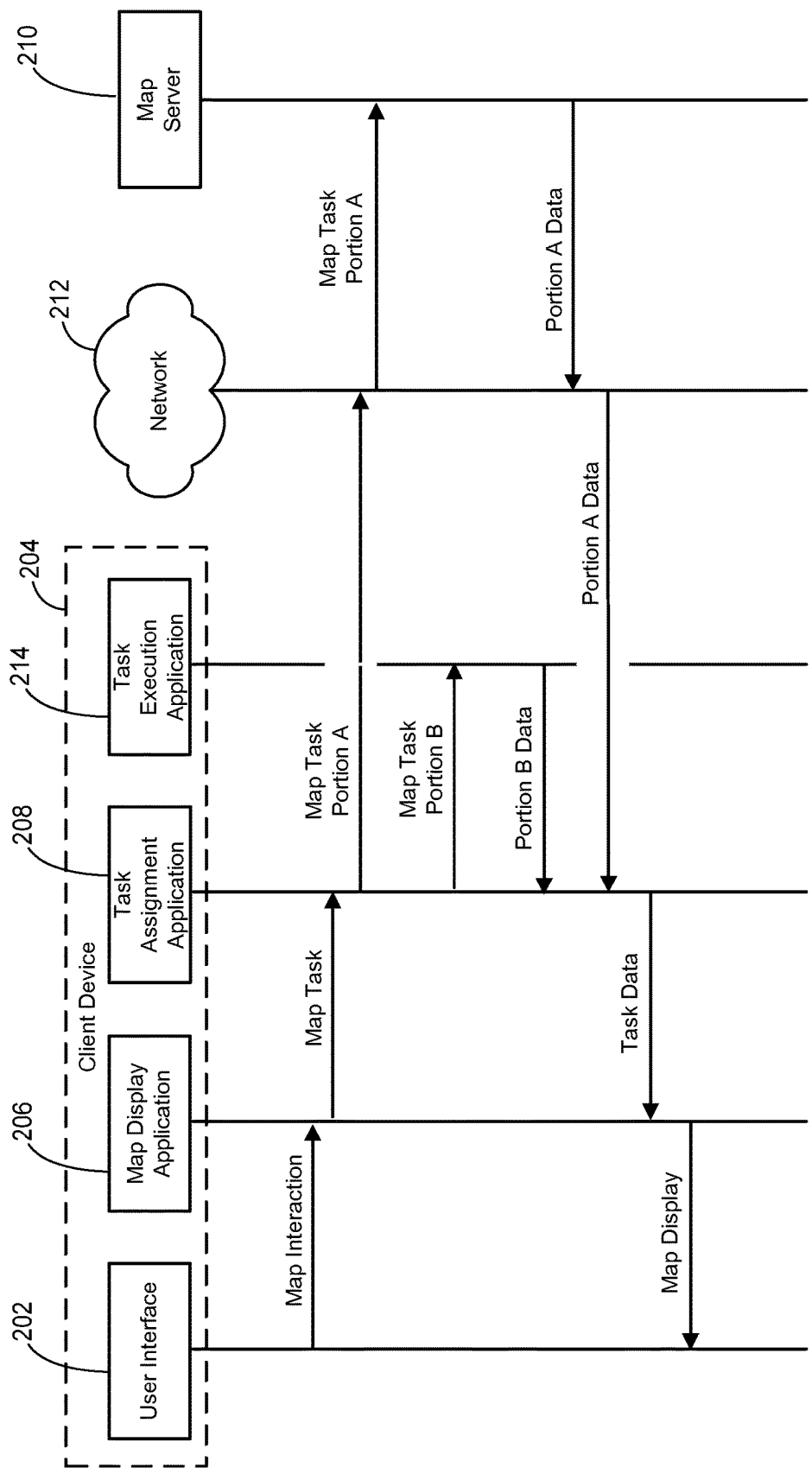
FIG. 2C is a communication flow diagram of a scenario in which each of a client device and a network server executes a respective task corresponding to a portion of a larger map-related task.
Figure 2D:
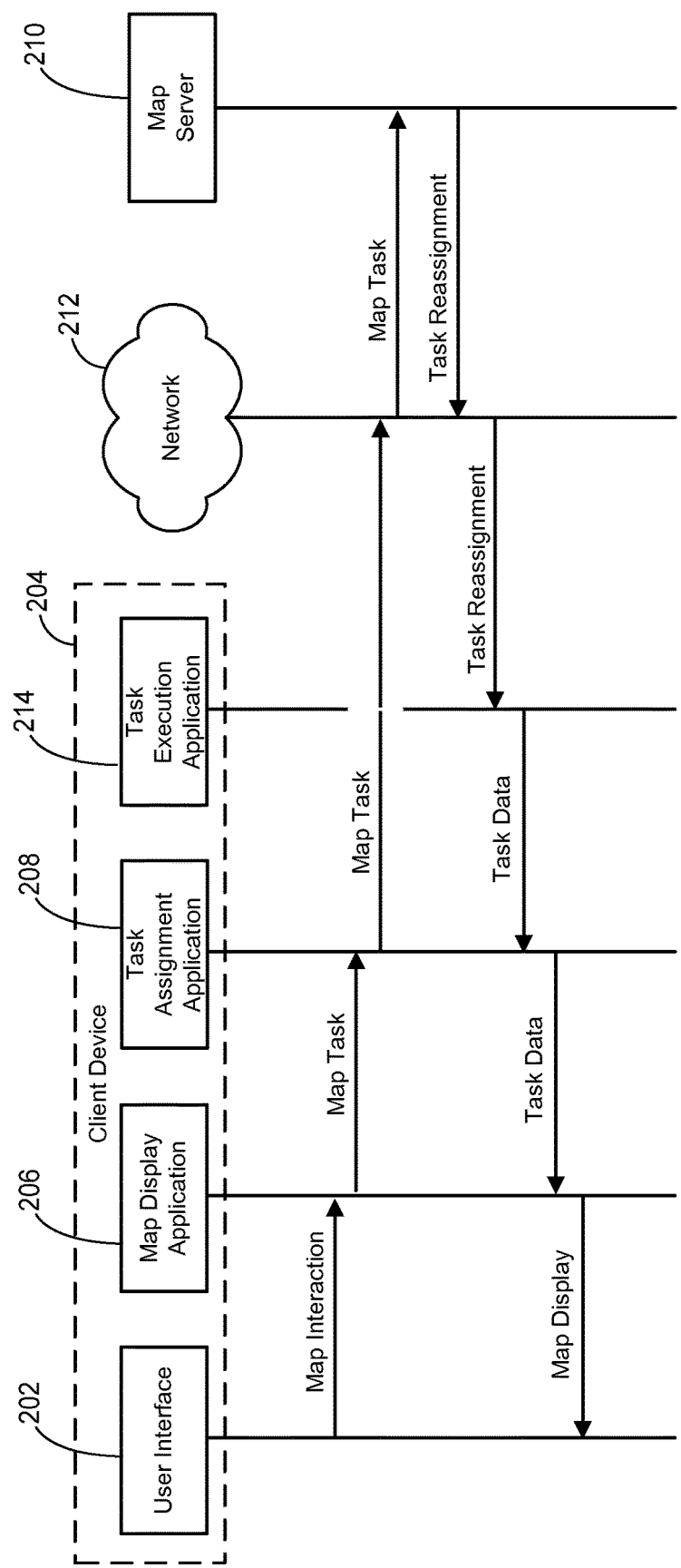
FIG. 2D is a communication flow diagram of a scenario in which a network server "reassigns" a map-related task previously assigned to the network server by a client device back to the client device.

FIG. 2C is a communication flow corresponding to another example scenario in which execution of a map task is divided between the client device 204 and the map server 210. After receiving a request for execution of a map task from the map display application 206, the task assignment application 208 may determine portions of the map task to be executed by the client device 204 (labeled as "Map Task Portion A") and portions of the map task to be executed by the map server 210 (labeled as "Map Task Portion B"). The task assignment application 208 may communicate requests for execution of Map Task Portions A and B to the task execution application 214 and to the map server 210, respectively. In response to these requests, the task assignment application 208 may receive task data from the task execution application 214 ("Task Data A") and from the map server 210 ("Task Data B"), aggregate or otherwise manipulate this received task data, and communication the received task data to the map display application. The map display application 206 may then display a map at the user interface 202 according to the task data.

In some cases, portions of a map task to be executed locally on the client device 204 may be dependent on portions of the map task to be executed on the map server 210, or vice versa. As such, one of the client device 204 and the map server 210 may wait to execute an assigned portion of the map task until receiving results of an execution of another assigned portion of the map task from the other of the client device 204 and the map server 210. For example, the client device 204 may wait to receive retrieved data from the map server 210 before executing further portions of a map task based on the retrieved data. In general, however, each portion of a divided map task may be executed simultaneously or in any suitable order.

In addition, a map server, such as the map server 210, may determine a "re-assignment" of a map task after receiving a request for execute or a map task or a portion of a map task. For example, in the communication flow illustrated in FIG. 2D, the map server 210 receives a request for the execution of a map task from the task assignment application 208 (via the network 212). Subsequently, the map server 210 may determine (e.g., by executing a task assignment module, such as the task assignment module 138) that current performance and/or communications capabilities of the map server 210 do not favor execution of the requested map task. For example, the map server 210 may be undergoing maintenance, experiencing errors, experiences a lack of bandwidth, in an emergency situation, etc.

As such, the map server 210 may "re-assign" execution of the map task back to the client device 204 by communicate a request for re-assignment to the task execution application 214 on the client device 204 or to the task assignment application 208 on the client device 204 (not shown). The client device 204 may execute the task execution application 214 to complete the map task and communicate task data back to the map display application 206.

Client Device Updates

Figure 3:
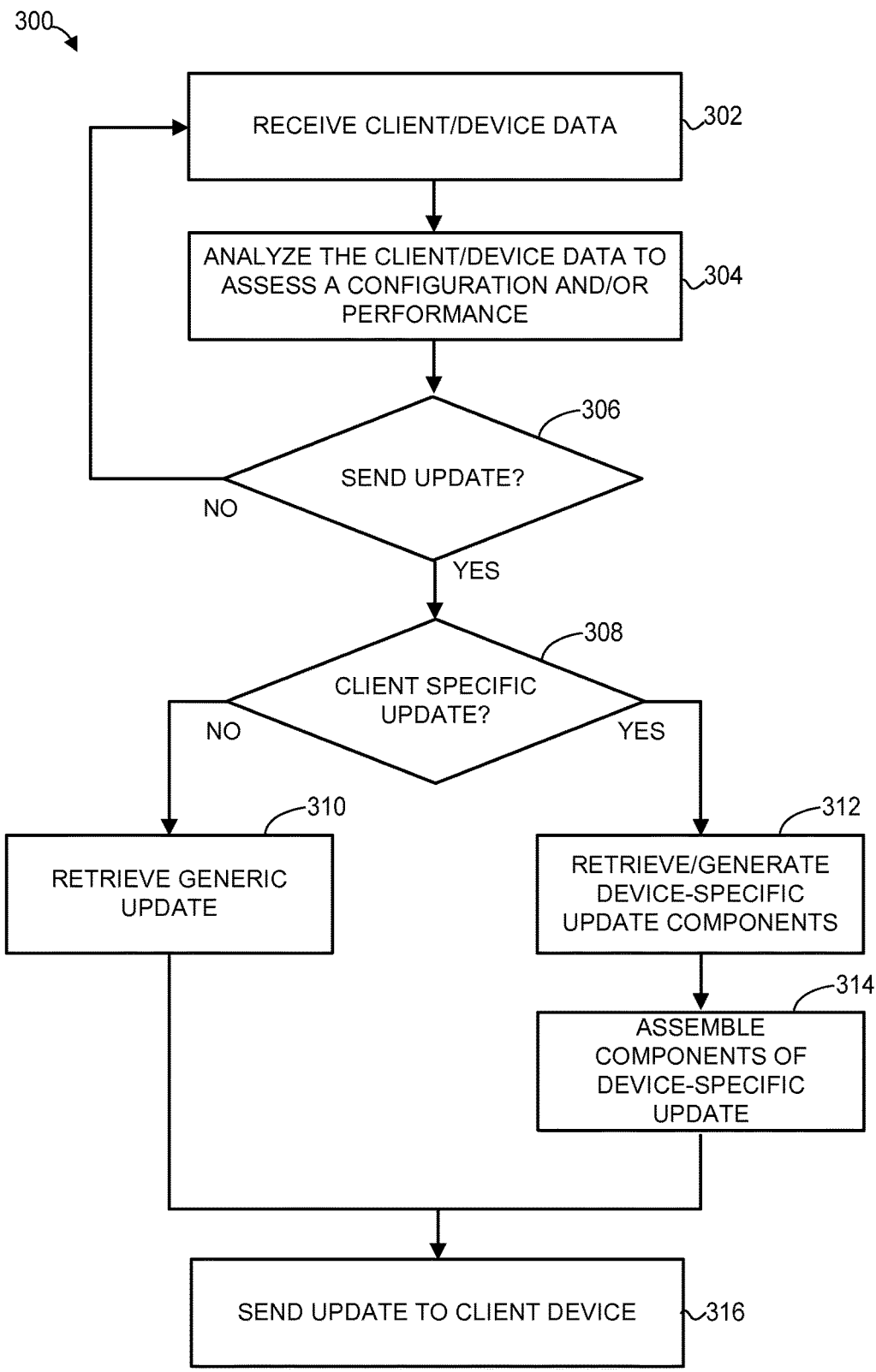
FIG. 3 is a flow diagram of an example method for generating updates to a software configured to execute map-related tasks on client devices.

FIG. 3 illustrates an example method 300 for generating and communicating application updates, such as OTA updates, for client devices. The application updates may be configured to update any suitable map related applications on a client device, but, in particular, the application updates may update or otherwise modify map display, task assignment, and/or task execution applications on a client device. For example, the method 300 may be implemented in the client application update generator 140 to provide updates to the client device 102 (e.g., updates for the task assignment application 111, task execution application 113, and map display application 104).

At block 302, data is received from a client device. The data may be indicative of the user of the client device and/or the device itself. For example, the received data may include data indicative of user preferences, such as user settings, user trends, user profile information, etc., assuming the user has provided consent for such use of the data. The received data may also include data indicative of the client device or applications stored on the client device, such as current device or application configurations, settings, performance metrics, etc. Generally, the received data may include any type of user or device representative data related to a past, current, and/or future operation of the client device.

Next (block 304), the received data is analyzed to assess a configuration and/or performance of map-related applications on the client device. For example, the client application update generator 140 may analyze the received data to assess whether map-related applications on the client device are: (i) consistent in configuration to corresponding map-related application on a map server; (ii) correspond to an outdated versions of the applications; (iii) configured so as to be efficiently executed by the client device; (iv) configured so as to efficiently communicate with a map server; or (v) configured so as to execute certain map task efficiently.

Based on the analysis of the received data, it is determined whether an update (e.g., a map-related application update) is to be sent to the client device (block 306). For example, consistency of a task execution application on the client device with a task execution module on the map server may provide seamless shifting of map tasks between the client device and the map server. As such, when it is determined that inconsistencies exist between applications on a client device and corresponding applications on a map server, an application update may be sent to the client device to ensure consistency. Alternatively, it may be determined that a version of an application on the client device may be outdated, and, therefore, an update may be sent to the client device to ensure that device applications are up-to-date. Generally, it may be determined to send an update to a client device for any suitable reason related to the efficient and consistent display of digital maps.

If it is determined that the client device is not to receive an update, the flow reverts to block 302 where further user/device related data may be retrieved. If it is determined that the client device is to receive an update, the flow continues to block 308.

At block 308, it is determined whether the update, to be sent to the client device, is to be device-specific. That is, it is determined if the update is to be generated, compiled, or developed such that it is specially configured for a specific client device. The client application update generator 140 may generate a send updates configured to allow applications to: (i) efficiently execute in specific client device hardware/software configurations; (ii) efficiently communicate with network devices, such the map server 101, via specific network interfaces and/or devices, such as the network interface 118; (iii) cache map data particularly relevant to or likely to be accessed by a user of the specific client device; or (iv) locally (i.e., on the specific client device) execute certain map tasks which are by default, or otherwise normally, executed on the map server 101. Generally, the device-specific updates may include updating the functionality or any portions of applications based on device-specific or user specific data, assuming the user consents to such use of the data.

To determine whether an application update for a client device is to be device-specific, the client application update generator 140 may consider a hardware configuration, software configuration, and/or user profile, in an implementation. For example, a specific hardware/software configuration of a client device, such as processor type, operating system version, amount of local memory, etc., may benefit from a particular update to a map-related application to increase efficiency. In another case, a user profile (e.g., including data representative of past user interactions with an application) may indicate that a user of the client device often initiates geographic queries for particular types of POIs (e.g., pizza) in a certain geographic area (e.g., Chicago). As such, an client specific update may allow a map-related application to cache map data related to the particular types of POIs in the certain geographic area such that the client device may efficiently satisfy geographic queries.

If it is determined that the client device is not to receive a device-specific update, the flow continues to block 310. At block 310, a generic (i.e., non-device-specific) update may be retrieved, such as a update to the version of an application or an update fixing a common application error. After retrieving a generic update, the flow continues to block 316.

If it is determined that the update is to be device-specific, the flow continues to block 312 where components of the device-specific update are generated or retrieved. For example, the client application update generator 140 may retrieve some components (software modules, libraries, configuration files, etc.) of the device-specific update from the task execution instructions 134 in the database 130. In addition or alternatively, the client application update generator 140 may generate components of the device-specific update based on user/device data recently gathered or stored in the database 130.

Next (block 314), the components of the device-specific update are assembled. In some cases, assembling the device-specific update may include compiling computer-readable instructions (e.g., code) based on specific configuration files or software modules. In other cases, assembling of the device-specific update may include aggregating the components into one or more files, communication packets, or other structures, such that the components may be sent to the client device for compiling or integration into an existing application. After the components of the device-specific update are assembled, the flow continues to block 316.

At block 316, the update, either generic or device-specific, is sent to the client device. For example, the update may be sent as an OTA update via a suitable mobile or wide area network, such as the network 112. The map server 101 may send the update to the client device 102 according to a standard or proprietary protocol, such as HTTP, file transfer protocol (FTP), or a proprietary protocol for map-related applications.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for dynamically shifting map task execution through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method for efficiently generating geographic content for display on client devices, the method comprising:
    determining, by one or more processors, a current status of a client device;

determining, by the one or more processors, a current status of a network connection between the client device and a network server;
based at least on one of (i) the determined current status of the client device or (ii) the determined current status of the network connection, determining, by the one or more processors, whether a task executable on the client device and the network server, and related to generating geographic content for display on the client device should be executed on the client device or on the network server;
in a first instance, causing, by the one or more processors, the client device to execute the task in accordance with the determination of where the task should be executed, including executing a limited version of the task; and
in a second instance, causing, by the one or more processors, the network server to execute a full version of the task, in accordance with the determination of where the task should be executed.

2. The method of claim 1, wherein causing the client device or the network server to execute the task in the first instance and the second instance, respectively, includes causing the client device and the network server to determine navigation directions for navigating a user of the client device from a source to a destination.

3. The method of claim 1, wherein determining the current status of the client device includes determining, by the one or more processors, a status of a battery with which the client device is powered.

4. The method of claim 1, wherein determining the current status of the network connection includes determining, by the one or more processors, a current downlink bandwidth of the network connection.

5. The method of claim 1, wherein determining the current status of the network connection includes determining, by the one or more processors, a current cost of transmitting data packets via the network connection.

6. The method of claim 1 implemented in the client device that includes the one or more processors, the method further comprising:
in response to determining that the task should be executed on the network server, transmitting a message to the network server to request that the task be executed on the network server, and
receive, from the network server, a result of executing the task.

7. The method of claim 1 implemented in the network server, further comprising:
determining a current load of the network server;
wherein determining whether the task should be executed on the client device or on the network server is further based on the determined current load of the network server.

8. The method of claim 1, wherein the task is one of a plurality of tasks related to generating the geographic content, the method further comprising causing the other one of the client device and the network server to execute another one of the plurality of tasks.

9. A client device comprising:
a user interface;
a communication interface to couple the client device to a network server via a communication link;
processing hardware coupled to the user interface and the communication interface, the processing hardware configured to:
determine a current status of the communication link, and
based at least in part on the determined status of the communication link, determine whether a task executable on the client device and the network server, and related to generating geographic content for display via the user interface should be executed on the client device or on the network server,
in a first instance, in response to determining that the task should be executed on the client device, execute a limited version of the task, and
in a second instance, in response to determining that the task should be executed on the network server, transmit a message to the network server to request that the task be executed thereon, wherein the network server executes a full version of the task.

10. The client device of claim 9, further comprising a battery;
wherein the processing hardware is further configured to:
determine a current status of the battery, and
determine whether the task should be executed on the client device or on the network server further in view of the current status of the battery.

11. The client device of claim 9, wherein to determine the current status of the communication link, the processing hardware is configured to determine current downlink bandwidth of the communication link.

12. The client device of claim 9, wherein the processing hardware is further configured to:
identify a plurality of tasks related to generating geographic content to be executed on the client device or on the network server,
determine, based at least in part on the determined status of the communication link, (i) a first group of one or more the plurality of tasks to be executed on the client device, and (ii) a second group of one or more the plurality of tasks to be executed on the network server, and
execute the first group of tasks, and
transmit one or more messages to the network server to request that the second group of tasks be executed thereon.

13. The client device of claim 9, wherein the processing hardware is further configured to:
cache map data corresponding to a category of map data, the category of map data at least one of:
(i) having a relatively high level of user interest as compared to other categories of map data, or
(ii) being frequently accessed by a user of the client device; and
determine, based on the caching of the map data, whether the task related to generating geographic content for display via the user interface should be executed on the client device or on the network server.

14. The client device of claim 13, wherein the map data is first map data and the category of map data is a first category of map data, and wherein the processing hardware is further configured to:
cache second map data corresponding to a second category of map data,
the second category of map data having a lower level of user interest than the first category of map data, and
the second map data corresponding to a smaller geographic area than the first map data.

15. A communication system comprising:
a client device configured to execute tasks of a certain type, related to generating geographic content for display on the client device;
a network server coupled to the client device via a communication network, the network server configured to execute tasks of the certain type upon request;
software instructions executed on one or more processors in the client device and/or the network server, the software instructions configured to:
  determine a current status of a network connection between the client device and the network server,
  select, based at least on the current status of the network connection, one of the client device or the network server for execution of a task of the certain type,
  in a first instance, cause the client device to execute a limited version of the task in accordance with the selection; and
  in a second instance, cause the network server to execute a full version of the task in accordance with the selection.

16. The communication system of claim 15, wherein the task includes generating navigation directions for navigating a user of the client device from a source to a destination.

17. The communication system of claim 16, wherein:
the network server is configured to receive data indicative of current road conditions,
the network server is configured to generate the navigation directions using the current road conditions, and
the client device is configured to generate the navigation directions without accounting for the current road conditions.

18. The communication system of claim 15, wherein the client device is a mobile device including a battery, and wherein the task assignment module is further configured to:
  determine a current status of the battery, and
  select one of the client device or the network server further in view of the current status of the battery.

19. The communication system of claim 15, wherein to determine the current status of a network connection, the task assignment module is configured to determine a current bandwidth of the network connection.

20. The communication system of claim 15, wherein to determine the current status of a network connection, the task assignment module is configured to determine a current cost of transmitting data packets via the network connection.

* * * * *